March 10, 1970     E. G. OBEDA     3,499,808
METHOD AND APPARATUS FOR SECURING PARTS TOGETHER BY SONIC ENERGY
Filed March 7, 1967     3 Sheets-Sheet 1
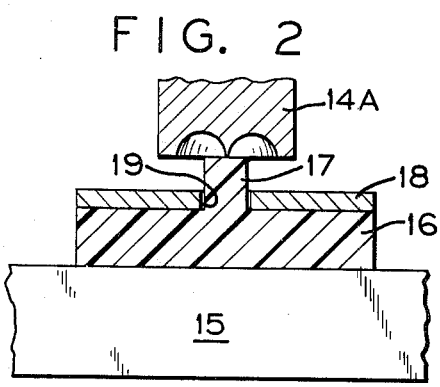
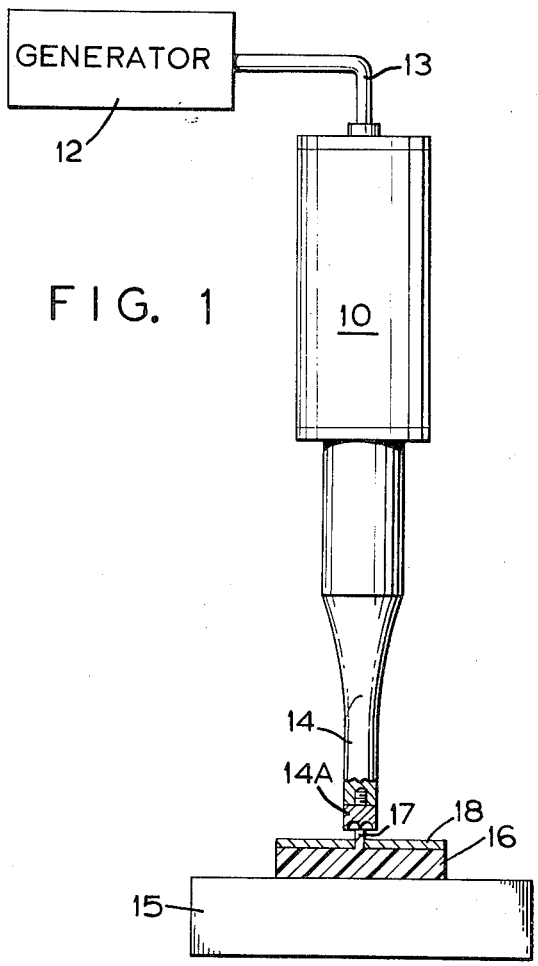
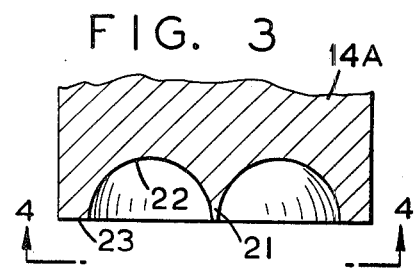
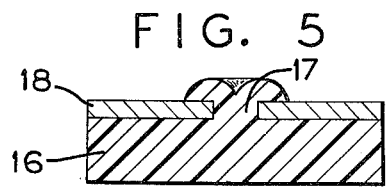
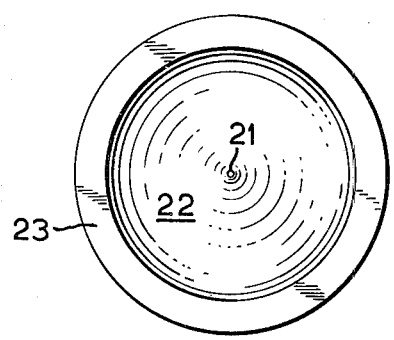
INVENTOR
EDWARD G. OBEDA
BY:
Erwin B. Steinberg

INVENTOR.
EDWARD G. OBEDA

INVENTOR.
EDWARD G. OBEDA

United States Patent Office 3,499,808
Patented Mar. 10, 1970

3,499,808
METHOD AND APPARATUS FOR SECURING PARTS TOGETHER BY SONIC ENERGY
Edward G. Obeda, Brookfield, Conn., assignor to Branson Instruments, Incorporated, Stamford, Conn., a corporation of Delaware
Filed Mar. 7, 1967, Ser. No. 621,228
Int. Cl. B29c 27/08
U.S. Cl. 156—73          8 Claims

ABSTRACT OF THE DISCLOSURE

A method and apparatus for securing a thermoplastic part to another part by applying sonic energy to a projection of the thermoplastic part and causing deformation thereof, such as peening over. In order to localize softening of the thermoplastics, the projection is contacted by a tool having a progressively increasing contact area.

---

This invention refers to certain improvements with regard to a sonic method and apparatus for securing thermoplastic parts to other parts as described in the copending application for U.S. Letters Patent in the name of Robert S. Soloff, Ser. No. 366,177, filed May 8, 1964 entitled "Sonics," now Patent No. 3,367,809 dated Feb. 6, 1968.

It is often desired to secure a part formed of a thermoplastic material to another part which may or may not also be thermoplastic.

Such securement in the past has commonly been done by adhesives. The use of an adhesive is inherently messy, however, and the resulting bond is often initially weak or, even if initially satisfactory, becomes brittle and weak with age. If the adhesive escapes the bonding zone, the resulting article may be rendered commercially unacceptable or aesthetically displeasing. Quite importantly, however, adhesive bonding is slow, because of the long curing time required for the adhesive, and is space consuming, because of the large drying areas required.

In the patent application identified hereinabove there has been described a method whereby one or more upstanding projections in the form of bosses or studs of a thermoplastic part are placed through corresponding apertures in another part, which is to be fastened to the thermoplastic part, and subsequently sonic energy, preferably in the ultrasonic frequency range, is coupled to the protruding free end of the projections. By virtue of the dissipation of sonic energy the thermoplastic projections soften and the tool which provides the sonic energy and is in contact with the free end of the projection flattens the softened thermoplastic projection, obtaining a peening over effect.

While this method has been used successfully in many cases, it has been found that in certain other cases introducing sonic energy into the projection is not entirely satisfactory. In such instances, the projection forms an integral part of the larger workpiece and the sonic energy introduced at the free end of the projection is conducted to and absorbed by the larger mass of the workpiece, causing softening of some undesired portion of the workpiece.

Tests conducted have shown that the dissipation of the sonic energy can be localized and controlled to occur initially only in an extremely small portion of the projection, particularly at the contact area with the tool, and then be expanded slightly for shaping the free end of the projection so as to obtain a peening over effect. This localization of dissipated energy, and therefore maintaining the integrity of the workpiece, can be achieved most successively with a tool which has a progressively increasing contact area engaging the free end of the projection. In this way, the riveting or staking action can be controlled within very precise limits and greatly improved results on relatively small and critical workpieces have been achieved.

Accordingly, it is an object of the present invention to provide a method and apparatus of securing parts to other parts, overcoming the heretofore noted disadvantages and shortcomings of the prior art.

Another object of this invention is the provision of a method and apparatus for securing a thermoplastic part to another part using sonic energy which is applied to the free end of a projection extending through an opening in the other part.

A further object of this invention is to provide a staking or riveting method for thermoplastic parts which can be controlled quite accurately to provide improved results.

A further and still other object of this invention is to provide a method and apparatus for fastening a thermoplastic part to another part, using a protruding projection to which sonic energy is applied for peening purposes, the softening and flowing of the thermoplastic material being closely controlled.

Still further and other objects of this invention will be more clearly apparent by reference to the following description when taken in conjunction with the accompanying drawings in which:

FIGURE 1 is a schematic illustration of the apparatus and method for accomplishing the fastening process in accordance with this invention;

FIGURE 2 is a cross sectional view of the workpiece and of the tool for accomplishing the process;

FIGURE 3 is an enlarged cross sectional view of the front end of the tool alone;

FIGURE 4 is a plan view along 4—4 in FIGURE 3;

FIGURE 5 is a sectional view of the workpiece after the method of securing has been practiced;

Figure 6:
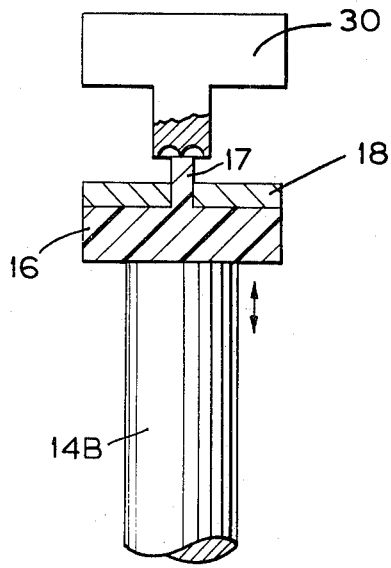
FIGURE 6 is a schematic illustration of an alternative embodiment of the process.

Referring now to the figures and FIGURE 1 in particular, numeral 10 refers to an ultrasonic energy transducer which is fed from an electrical generator 12 via a conductor 13. The transducer 10, which includes either piezoelectric or magnetostrictive means for converting electrical energy applied to acoustic vibrations, is provided with a horn 14 which acts as an impedance transformer and is used generally for increasing the amplitude of the longitudinal vibrations apparent at the frontal surface of the horn. Typically, the sonic vibrations are 20 kc./second which is in the ultrasonic frequency range.

Figure 9:
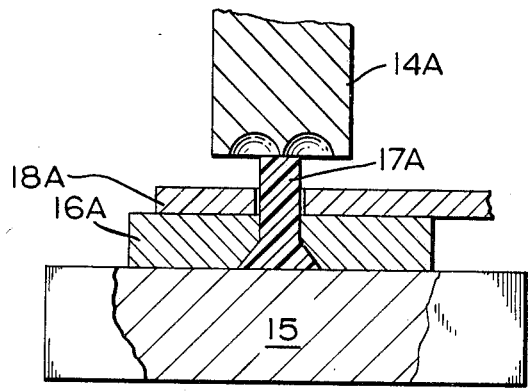
FIGURE 9 is a cross-sectional view of an alternative embodiment.
Figure 10:
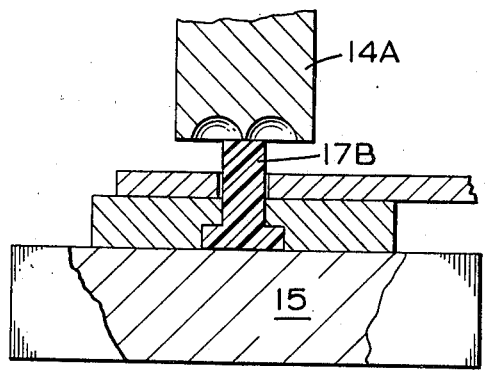
FIGURE 10 is a cross-sectional view of still a further alternative embodiment.

Referring also to FIGURES 2, 3 and 4, a support plate 15 supports a workpiece 16 which is made of polymeric thermoplastic material and is provided with one or more upstanding projections 17. The projection, typically, is of circular cross section and is moulded integrally with the thermoplastic workpiece 16. A second workpiece, such as a plate 18, is placed in juxtaposition with the workpiece 16 so that a respective aperture 19 of the plate 16 encircles the projection 17. The free upstanding end of the projection 17 is adapted to be contacted by the frontal end 14A of the horn 14. The frontal end 14A may be a part of the horn or, alternatively, comprises a separate tool tip threaded into the horn. Similarly, the projection may be a separate fastener of rivet-like form as is shown in FIGURES 9 and 10, items 17A and 17B being separate rivet-like fasteners of thermoplastic material. The two workpieces 16A and 18A to be fastened to each other may then comprise metal, plastics, or a combination thereof.

The frontal surface of the horn is shown in an enlarged view in FIGURES 3 and 4. The frontal surface of the horn is shaped in a very specific manner in order to localize the transfer of sonic energy and to cause only localized softening of the thermoplastic material within the frontal portion of the projection 17. This shape, or contour, comprises an initial central contact surface 21 which is tapered from a point toward a base portion so as to progressively exhibit an increasing contact area. The initial contact surface is in adjoining relation with a shaping surface 22, essentially an annular recess. The annular recess is limited by a peripheral flat surface 23.

As the oscillating horn 14 with the tip 14A is brought into forced contact with the free end of the projection 17, the pointed end of the initial contact surface 21 establishes the contact with the projection, transferring sonic energy into a very localized area which heats up responsive to the dissipation of sonic energy. As the thermoplastic material softens and the horn remains in engagement with the free end, progressively a larger area of the contact surface 21 engages the projection 17 until the shaping surface 22 also is in engagement with the projection 17 and shapes the softened projection material into a head, causing the peened over effect clearly illustrated in FIGURE 5. Also, as a result of the softening of the projection and the force applied thereto, the shank of the projection is expanded to take up all clearance. It will be apparent that in order to obtain the peening over, the diameter of the tip 14A must be larger than the diameter of the projection 17.

Since softened thermoplastic material has a relatively low acoustic impedance and provides attenuation to the conduction of acoustic energy, by concentrating the sonic energy transfer within an initially small, but progressively enlarged, area of the projection and causing the material thereat to soften, the transmission of sonic energy into the larger portion of the workpiece 16 is essentially limited.

FIGURE 6 shows an alternative arrangement wherein the projection 17 is in contact with a stationary tool bit 30 having a frontal surface which is similar to that shown in FIGURE 3, but sonic energy is coupled to the workpiece 16 by means of a horn 14B having a flat frontal surface which engages the rear surface of the workpiece 16. The acoustic energy losses occur at the area of engagement between the projection 17 and the tool 30 responsive to the relative motion between these two parts. The same result is achieved as described in connection with FIGURES 1 through 5.

Figure 7:
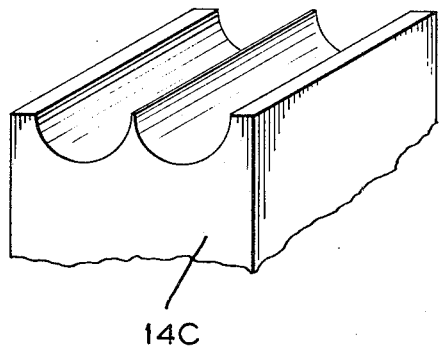
FIGURE 7 is a perspective view of an alternative embodiment of the tool.

A further alternative arrangement is shown in FIGURE 7 wherein the frontal surface of the horn 14C, or the tool, is of an elongated bar shape as contrasted with the circular cross section illustrated in FIGURES 3 and 4. The initial contact surface and the adjoining shaping surface are essentially of the same general configuration.

Figure 8:
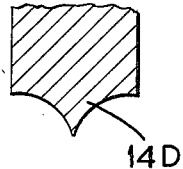
FIGURE 8 is a sectional view of still another embodiment of the tool.

A still further alternative embodiment of the tool is shown in FIGURE 8. The tool 14D, which may be the front of the horn itself, is provided merely with the initial surface increasing in contact area. This shape is useful when the aperture 19 of the workpiece is countersunk and a flush "riveting" effect is to be achieved. The tool's curvature rearward of the initial point of contact provides the shaping of the softened and displaced material.

In a typical example using a transducer oscillating at about 20 kHz. and rated 150 watts, securing of parts having projections of approximately ⅛" diameter is achieved in one second. The time during which the sonic energy is transferred comprises only a part of the entire cycle. Since the horn tip or tool remains relatively cool, it is retained briefly in engagement with the projection after the sonic energy has been shut off while being urged against the workpiece, whereby the hardening of the plastic material is accelerated and, as the result of pressure, a tight assembly is achieved. The shaping of the contact surface is particularly useful for maintaining the integrity of the workpiece, i.e. preventing softening of the plastic material at an undesired location.

What is claimed is:

1. A method of securing two parts to each other by means of a thermoplastic projection extending from one of the parts, said method comprising the steps of:
   placing said parts into juxtaposition with said projection extending from one of the parts;
   contacting the exposed end of said projection with a tool having a contact surface which progressively increases in area, and a shaping surface adjoining said contact surface for subsequent contact with said exposed end, and
   introducing sonic energy into the area of contact between said tool and said exposed end while providing a compressive force therebetween,
   whereby, responsive to the dissipation of sonic energy, progressively a larger area of the exposed end of said projection is softened and shaped by the surfaces of the tool in engagement therewith.

2. A method of securing a thermoplastic part having a projection to another part having an opening therein, said method comprising the steps of:
   placing said parts into juxtaposition with said projection disposed in said opening;
   contacting the free end of said projection with a tool having an initial contact surface which progressively increases in area, and a shaping surface adjoining said contact surface for subsequent contact with said free end of said projection;
   introducing sonic energy into the area of contact between said tool and said free end of said projection while providing a compressive force therebetween;
   whereby, responsive to the dissipation of sonic energy, said initial contact surface causes localized yet progressive softening of said projection at its free end, and such softened material then is shaped by the subsequent contact with said shaping surface of the tool as softening continues in response to the increased contact between said tool and said projection.

3. A method of securing a thermoplastic part having a projection to another part as set forth in claim 2 wherein sonic energy is supplied to said tool.

4. A method of securing a thermoplastic part having a projection to another part as set forth in claim 2 wherein sonic energy is supplied to the thermoplastic part.

5. A method of securing a thermoplastic part as set forth in claim 2 wherein said tool has an upstanding central projection which increases in cross section and said shaping surface is a concave area adjacent to said upstanding projection of said tool.

6. A method of securing as set forth in claim 2 wherein said initial contact surface is a central projection which substantially comes to a point and said shaping surface is an annular groove adjoining the base of said central projection.

7. A method of securing as set forth in claim 2 wherein said shaping surface extends beyond the periphery of the projection of the thermoplastic part in order to achieve a peening over effect.

8. A method of securing two parts to each other by means of a thermoplastic projection extending from one of the parts, said method comprising the steps of:
   placing said parts in juxtaposition with said projection extending from one of the parts;
   contacting the exposed and free end of said projection with a tool having a contact surface which progressively increases in area, and having also a shaping surface adjoining said contact surface for subsequent contact with said free end of said projection;

introducing sonic energy into the area of contact between said tool and free end of said projection while providing a compressive force therebetween, whereby said initial contact surface, under the influence of sonic energy, causes localized yet progressive softening of said projection at its free end resulting from the dissipation of sonic energy, and such softened materials being shaped by the subsequent contact with said shaping surface of the tool as such softening continues in response to the increased contact between said tool and said projection; and stopping the transfer of sonic energy between said tool and projection while maintaining a compressive force therebetween, whereby to provide a period of dwell during which the softened thermoplastic material hardens and the maintenance of the compressive force causes said two parts to form a tight assembly.

References Cited

UNITED STATES PATENTS

| | | |
|---|---|---|
| 2,458,152 | 1/1949 | Eakins. |
| 3,146,141 | 8/1969 | Woodland _____ 156—580 X |
| 3,365,349 | 1/1968 | Daniels _____ 156—580 |
| 3,367,809 | 2/1968 | Soloff _____ 156—73 |

OTHER REFERENCES

"Ultrasonic Staking Works Well in Joining Plastic to Metal," Product Engineering, Jan. 2, 1967, p. 79.

CARL D. QUARFORTH, Primary Examiner

A. J. STEINER, Assistant Examiner

U.S. Cl. X.R.

29—470.3; 156—91, 580